US009016168B2

(12) United States Patent
Prokhorov (10) Patent No.: US 9,016,168 B2
(45) Date of Patent: Apr. 28, 2015

(54) DRIVER ADAPTIVE METHOD FOR VEHICLE ACTUATION WITH STEERING WHEEL CONTROLS

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 263 days.

(21) Appl. No.: 12/910,630

(22) Filed: Oct. 22, 2010

(65) Prior Publication Data

US 2012/0096969 A1 Apr. 26, 2012

(51) Int. Cl.
| | | |
|---|---|---|
| *B62D 1/06* | (2006.01) | |
| *B60K 26/02* | (2006.01) | |
| *B60T 7/08* | (2006.01) | |
| *B60T 7/10* | (2006.01) | |
| *B62D 1/04* | (2006.01) | |

(52) U.S. Cl.
CPC . *B62D 1/06* (2013.01); *B60K 26/02* (2013.01); *B60T 7/085* (2013.01); *B60T 7/10* (2013.01); *B62D 1/046* (2013.01)

(58) Field of Classification Search
CPC ............ B60K 26/02; B60T 7/085; B60T 7/10
USPC ............. 74/552; 180/333; 280/88; 200/61.54
See application file for complete search history.

(56) References Cited

U.S. PATENT DOCUMENTS

| | | | |
|---|---|---|---|
| 2,793,262 A | 5/1957 | Albert | |
| 5,189,619 A | 2/1993 | Adachi et al. | |
| 5,335,743 A | 8/1994 | Gillbrand et al. | |
| 5,521,823 A | 5/1996 | Akita et al. | |
| 5,603,674 A | 2/1997 | Rivas et al. | |
| 5,620,393 A * | 4/1997 | Minowa et al. | 477/155 |
| 5,808,374 A | 9/1998 | Miller et al. | |
| 5,855,144 A * | 1/1999 | Parada | 74/552 |
| 5,949,149 A | 9/1999 | Shitanaka et al. | |
| 6,134,498 A * | 10/2000 | Oba | 701/84 |
| 6,553,301 B1 * | 4/2003 | Chhaya et al. | 701/54 |
| 6,571,154 B2 | 5/2003 | Worrell et al. | |
| 6,997,281 B2 * | 2/2006 | Chernoff et al. | 180/333 |
| 7,278,510 B1 | 10/2007 | Richards | |
| 7,424,361 B2 * | 9/2008 | Masuda et al. | 701/101 |
| 2002/0104705 A1 * | 8/2002 | Kuhn, Jr. | 180/333 |
| 2003/0023353 A1 * | 1/2003 | Badarneh | 701/1 |
| 2003/0230161 A1 * | 12/2003 | Snell | 74/552 |
| 2004/0108161 A1 * | 6/2004 | Ohno | 180/315 |
| 2005/0167252 A1 * | 8/2005 | Inoue et al. | 200/61.54 |
| 2005/0179661 A1 * | 8/2005 | Bohn | 345/163 |
| 2005/0274563 A1 | 12/2005 | Ahnafield | |

(Continued)

FOREIGN PATENT DOCUMENTS

WO WO 2010/133656 * 11/2010 ............... B60T 7/10

*Primary Examiner* — Vinh Luong
(74) *Attorney, Agent, or Firm* — Oblon, McClelland, Maier & Neustadt, L.L.P.

(57) ABSTRACT

A steering wheel and associated control system to execute a corresponding algorithm, the steering wheel including a rim which is rotatable about a first axis to steer a vehicle, and a throttle dial disposed in a surface of the rim. The throttle dial controls a throttle of the vehicle and has a variable output to control an amount of the throttle in proportion to an amount the throttle dial is displaced from a nil output position. A similar brake dial is also provided, and is also disposed in the surface of the rim at another location, thus providing hand operation of a throttle and brake of a vehicle without having to remove one's hands from the steering wheel.

15 Claims, 5 Drawing Sheets

(56) References Cited

U.S. PATENT DOCUMENTS

2006/0054479 A1    3/2006  Iisaka et al.
2007/0193814 A1*   8/2007  Dupont et al. ................. 180/333
2007/0289402 A1*  12/2007  La et al. .......................... 74/513
2010/0212630 A1*   8/2010  Nozoe et al. ................... 123/399
2010/0288072 A1*  11/2010  Springer et al. ................. 74/552
2012/0283894 A1*  11/2012  Naboulsi ........................... 701/1
2014/0022070 A1*   1/2014  Golomb ......................... 340/475

* cited by examiner

DRIVER ADAPTIVE METHOD FOR VEHICLE ACTUATION WITH STEERING WHEEL CONTROLS

BACKGROUND

1. Field of Disclosure

This disclosure relates generally to vehicle throttle (acceleration) and brake (deceleration) controls mounted to a steering wheel.

2. Discussion of the Background

Control of a vehicle's throttle and brake mechanisms is generally performed via throttle and brake foot pedals. However, such systems also include complimentary input systems, such as pedals or buttons located on or approximate to a steering wheel, to implement cruise control functionality. Additionally, some of these functions may also include adaptive technology to add or reduce speed.

These controls are generally provided to gently increase or decrease the car's speed without the need to press on the throttle or brake pedals. Further, several systems have been designed for handicapped or disabled persons to implement hand control pedals which mimic the foot pedals for throttle and brake control. Such systems are generally retrofitted into a standard vehicle, requiring significant modification to the vehicle.

SUMMARY

This disclosure identifies and addresses problems in the art associated with heavy traffic driving when a driver's legs and/or feet tire due to frequent pedal actions associated with accelerations and decelerations. In particular, it is identified that the use of hand controlled mechanisms to control the throttle and brake of a vehicle can provide a driver with a more comfortable driving experience in slow and stop-and-go traffic, in which cruise control technology is deficient. Specifically, cruise control is generally helpful to a user only in moderate to high speed traffic where speed changes are infrequent.

The throttle and brake control systems described herein are designed to address these issues. In particular, the throttle and brake controls described herein are adaptable for all vehicle speeds, including slow speeds at which cruise control can be ineffective. Further, the throttle and brake control systems described herein implement a learning technology to capture driver preferences and style for gentle operability of the throttle and brake of the vehicle.

In view thereof, disclosed herein are aspects of a steering wheel which includes throttles and/or brake controls. In a first aspect, provided is a steering wheel having a rim which is rotatable about an axis to steer the vehicle. The rim has a surface, which disposed therein is a throttle dial to control the throttle of the vehicle. The throttle dial has a variable output to control an amount of the throttle in proportion to an amount of the throttle dial is displaced from a nil output position. In a further aspect, the throttle dial is configured to control a virtual gear ratio, where the virtual gear ratio is a ratio between the amount the throttle dial is displaced from the nil output position and the amount of the throttle.

In this particular aspect, the virtual throttle gear ratio is adjusted based on at least one of a recorded driving pattern (to adapt the virtual throttle gear ratio to driving preferences and/or habits), a speed of the vehicle, and an output from a manual knob. In another aspect, the virtual throttle gear ratio is adjusted based on a combination of the aforementioned parameters and/or an input by a computerized user interface.

The throttle dial is preferably a wheel which rotates about a second axis, where in a standard orientation the second axis is preferably substantially parallel to the axis about which the steering wheel rotates. In a further embodiment, the wheel is rotatable about a third axis which is substantially perpendicular to the second axis such that the second axis, about which the wheel rotates, is variable from being substantially parallel to the first axis to being substantially perpendicular to the first axis. In a further aspect, the wheel is disposed in a sleeve portion of the rim and is rotatable about an axis substantially tangential to the rim. Thus, the wheel can be rotated from a position which is on an interior side of the rim to an exterior side of the rim.

In a preferred aspect the throttle dial is disposed in an upper left portion of the rim when the steering wheel is rotated to a straight vehicle direction (corresponding to a ten o'clock hand position on the steering wheel). Further, the throttle dial is preferably biased towards the nil output position by means of a mechanical or electromechanical device. Such devices can include a spring and/or an electromagnet.

In further aspects, the surface of the rim in which the dial is disposed faces the first axis about which the rim rotates. Additionally, the throttle dial preferably includes a force-feedback device to indicate, by exerting a force against a displacement of the dial, that a further displacement of the dial is ineffective to increase the throttle.

The preferable aspects of this disclosure further include a brake dial disposed in the surface of the rim to control a brake of the vehicle, in a similar arrangement as the throttle dial, where the brake dial has a variable output to control an amount of the brake in proportion to an amount of the brake dial is displaced from a nil output position. Further, the brake dial is preferably configured to control a virtual brake gear ratio, where the virtual brake gear ratio is a ratio between the amount the brake dial is displaced from the nil output position and the amount of the brake. The brake gear ratio can be adjusted based on at least one of or a combination of recorded driving patterns (to adapt a brake throttle gear ratio to driving preferences and/or habits), a speed of the vehicle, and an output from a manual knob.

In further aspects, the brake dial is a second wheel which rotates about a fourth axis so that the second wheel is variable from being substantially parallel to the first axis to being substantially perpendicular to the first axis. Further, it is preferable the second wheel is disposed in a second sleeve portion of the rim which is rotatable about an axis substantially tangential to the rim. Thus, the second wheel can be rotated from a position which is on an interior side of the rim to an exterior side of the rim.

Preferably, the brake dial is disposed in an upper right portion of the rim when the steering wheel is rotated to a straight vehicle direction (corresponding to a two o'clock steering wheel hand position). Consequently, the throttle and brake dials are arranged on portions of the steering wheel which correspond to a standard forward hand position on the steering wheel. Similar to the throttle dial, the brake dial is preferably biased towards the nil position. In an alternative aspect, the positions of the throttle and brake dials can be interchanged.

In other aspects, the steering wheel includes only the brake dial or only the throttle dial, which are presented above.

In another aspect, a control mechanism is provided for a rim of a steering wheel, which includes a dial disposed in the surface of the rim to control one of a throttle and a brake, where the dial has a variable output to control an amount to the throttle or the brake in proportion to an amount the dial is displaced from a nil output position. Additionally, this control mechanism preferably includes a second dial disposed to control the other of the throttle and the brake.

In a further embodiment, a mechanism for a rim of a steering wheel is provided which includes a first control means, disposed in a surface of the rim, for controlling control one of a throttle and a brake. Here, the first control means has a variable output to control an amount of the throttle or the brake in proportion to an amount the first control means is actuated from a nil output position. A further aspect of this embodiment includes a second control means, disposed in the surface of the rim, for controlling the other of the throttle and the brake, the second control means having a variable output to control an amount of the throttle or the brake in proportion to an amount the second control means is actuated from a nil output position.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts/steps throughout the several views.

As noted above, FIG. 1 is a front view of a steering wheel including a throttle dial 100 and a brake dial 200. Although the disclosed aspect in this drawing figure shows both a throttle dial and a brake dial, it should be appreciated that some employments of this disclosure may only include one of the throttle dial 100 and a brake dial 200, and further that the locations of the same on the steering wheel may be adjusted to a different position or interchanged.

Figure 1:
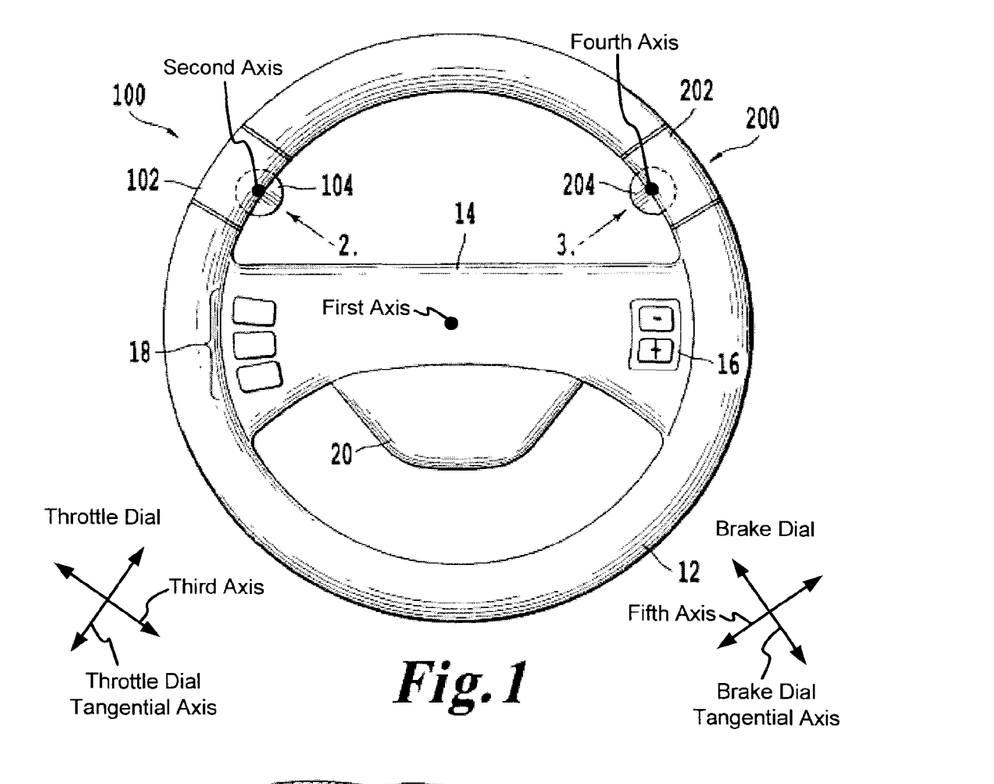
FIG. 1 is a front view of a steering wheel according to an aspect of this disclosure including a throttle dial and a brake dial.

As shown in FIG. 1, the throttle dial is shown at a standard ten o'clock hand position whereas the brake dial is shown in a standard two o'clock hand position, generally corresponding to the upper left and upper right portions of the steering wheel, respectively, when the steering wheel is rotated to a straight driving direction. This aspect corresponds to a standard two handed driving configuration. Consequently, it should be appreciated that other employments of this disclosure may be directed towards handicapped or disabled drivers, where the throttle dial and/or the brake dial are positioned at a different section of the steering wheel rim.

The steering wheel rim 12 is connected to a steering wheel hub 14, on which other control mechanisms can be disposed or coupled to. In particular, controls 16 are shown, which can include the control of a standard cruise control system. Further, controls 18 are shown, which can include control buttons for audio/video functionality of the vehicle or communication functionality of a cellular phone in cooperation with a hands-free system of the vehicle. However, it should be appreciated that other control devices can be implemented into the steering wheel 12 or the steering wheel hub 14 without detracting from the scope of the disclosure. Additionally, the hub 14 can include a safety device 20, such as an air bag system.

The throttle control 100 includes a throttle sleeve 102 and a dial 104. As shown in FIG. 1, the steering wheel rim 12 is circular. However, this disclosure is not limited to only a circular steering wheel and the same is shown in FIG. 1 for simplicity alone. As such, the throttle sleeve 102 has a long axis which is arranged along an axis which is substantially tangential to the steering wheel rim 12 and is rotatable about that same axis.

Further, the throttle dial 104 is rotatable about two separates axes, in a preferred embodiment, which is discussed in more details below.

FIG. 1 also shows a brake control 200, which includes a brake sleeve 202 and a brake dial 204. The structural arrangements of the brake control 200 is similar to the throttle control 100. At this time, it should be appreciated that the locations of the throttle control 100 and the brake control 200 can be exchanged so that the throttle control 100 is positioned at the upper right portion of the steering wheel rim 12 and the brake control 200 is positioned at the upper left portion of the steering wheel rim 12 without detracting from many aspects of this disclosure.

Figure 2:
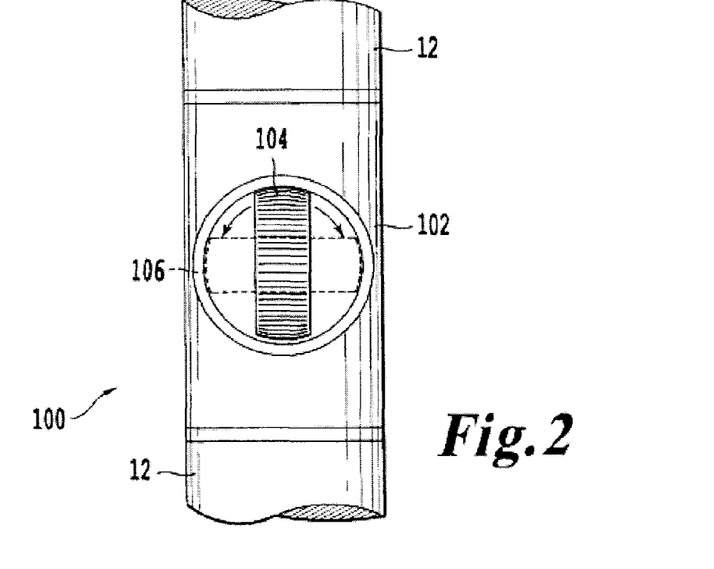
FIG. 2 is a view of the throttle dial from FIG. 1 taken from a radial direction of the steering wheel along arrow 2.

FIG. 2 is a view of a portion of the steering wheel rim 12 which includes the throttle control 100 taken along arrow 2 shown in FIG. 1, such that a radial view of the throttle control 100 is shown therein. As noted above, in a preferred aspect, the throttle dial 104 is rotatable about two axes. Specifically, the throttle dial 104 is a wheel which rotates about an axis which is substantially parallel to the axis of rotation of the steering wheel rim 12 when in the position shown in FIGS. 1 and 2. Additionally, the steering wheel dial 104 is also rotatable about a radial direction of the steering wheel rim 12 in the directional arrows shown in FIG. 2 such that a position 106 can be obtained. Further, at position 106 shown in FIG. 2, the throttle dial is rotatable about an additional axis which is tangential to the steering wheel rim 12. In other aspects, the sleeve 102 of the steering wheel rim 12 is rotatable relative to the steering wheel rim 12 to adjust the position of the throttle dial 104. In particular, the sleeve 102 is rotatable, in this aspect, in a direction tangential to the steering wheel rim 12. Consequently, the throttle dial can be rotated from an interior of the steering wheel to an exterior of the steering wheel, relative to the view of the steering wheel shown in FIG. 1.

Figure 3:
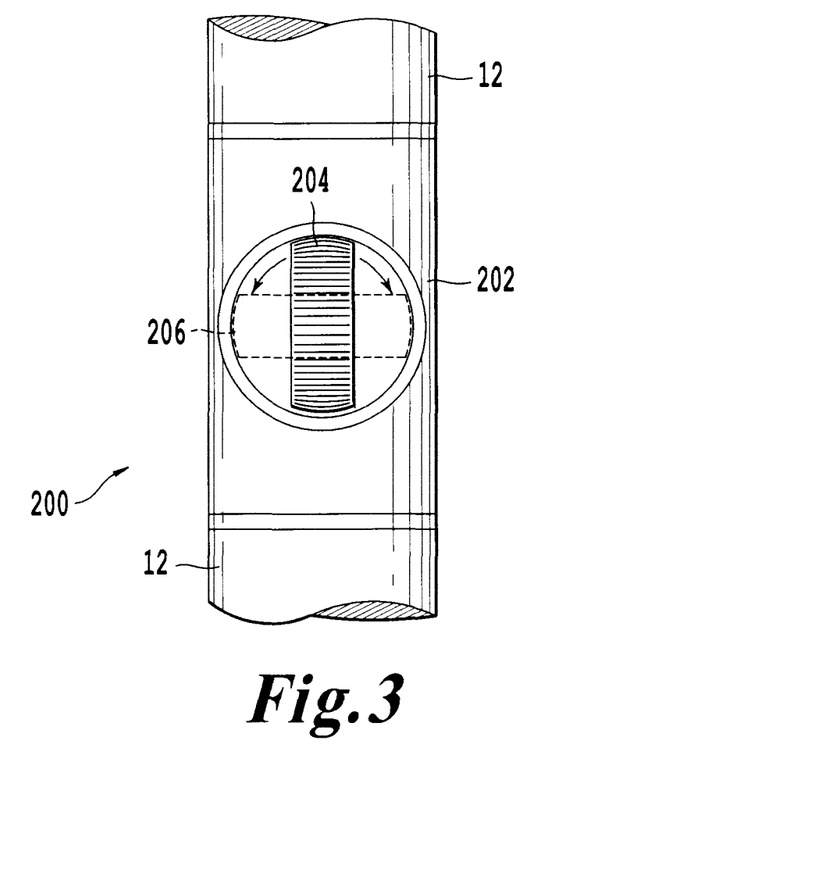
FIG. 3 is a view of the brake dial from FIG. 1 taken from a radial direction of the steering wheel along arrow 3.

FIG. 3 is a diagram showing the brake control 200 from the radial arrow 3 of FIG. 1. Although not necessarily configured and structured identical to the throttle dial, this embodiment is similar in functionality and structure to the throttle control 100 shown in FIGS. 1 and 2, including the rotatability of the brake dial 204 when the brake dial 204 is a wheel and the rotatability of the brake sleeve 202. Accordingly, a separate description of these structures is not provided for brevity since the arrangement of the brake control 200 is substantially similar to the arrangement of the throttle control 100.

The throttle and brake dials discussed above are shown in FIGS. 1-3 as wheels. However, it should be appreciated that it is not necessary that the throttle and brake dials discussed above be wheels. Specifically, a variably sliding switch can be provided, as well as a rotatable wedge can be provided. Further, for ease of use and for safety concerns, it is preferred that the throttle and brake dials discussed above include a biasing mechanism to bias the dials to a nil output position. Specifically, a spring and/or an electromagnetic device is provided to cause the throttle and brake dials to return to a nil output position, where a zero throttle and a zero brake output is transmitted to an electronic control unit (ECU). An exemplary ECU is discussed below.

Further, the throttle and brake dials preferably include a force-feedback device, which may be incorporated into the same mechanical and/or electromagnetic biasing device discussed above, to exert a force against the displacement of the respective dial to indicate to a driver that a further displacement of the throttle or brake dial is ineffective to increase the throttle or the brake. Thus, a user can be provided with an active reminder that vehicle speed or acceleration has reached a predetermined threshold limit or that full braking power has been applied. As to the full braking power, the force feedback mechanism for the brake dial can be configured to indicate to a driver that an electronic stability control mechanism or that an anti-lock braking system has been activated to implement full braking power for the vehicle. However, it should be appreciated that other braking and/or accelerating mechanisms directed to vehicle control can be indicated to the driver through the force feedback mechanism of the throttle and brake dials, respectively.

In a preferred aspect, the throttle and brake dials act as a virtual gear pair. Rotation or displacement of a dial results in a corresponding rotation or displacement of a virtual gear connected through the throttle or the brake. The dial can be considered an active gear, whereas the virtual gear can be considered a passive gear. If the passive gear is larger than the active gear, then the angular speed of a pedal for the throttle or the brake will be slower than the angular speed of the dial rotation or displacement. If the passive gear is smaller than the active gear, then the angular speed of the pedal will be faster than the angular speed of the dial. As noted above, the dial is a throttle dial or a brake dial to control the throttle or brake of the vehicle, respectively, and the following disclosure is equally applicable to both of the throttle dial and the brake dial. However, a discussion including an explicit description of either the throttle dial of the brake dial may be omitted for brevity because an exemplary embodiment of one of the dials includes a substantially similar arrangement for the other of the dials.

An exemplary implementation of aspects of this disclosure is described below by way of example. Suppose a driver wishes to accelerate the vehicle until some speed is reached and then slow it down without pressing throttle or brake pedals of a vehicle. The driver, according to preferred aspects of this disclosure, will rotate the throttle dial with a finger in the direction linked with a throttle increase, which translates to a vehicle acceleration commensurate with the virtual gear ratio for the throttle (gear ratio for throttle—GRT). In some aspects and employments, such an increase in throttle may also cause the throttle pedal to move accordingly (without the need for the driver to actually depress the throttle pedal). However, it is not required for the proper operation of aspects of this disclosure for the throttle pedal to move accordingly. However, this aspect is preferred in case a user disengages use of the throttle and brake dials and immediately resumes use of the throttle and brake pedals, which results in a gentle, smooth and continuous operation of the vehicle.

If throttle dial rotation or displacement is stopped, then the vehicle will gradually reach a cruising speed in a similar operation as if the driver had actually pressed and held steady a position of the throttle pedal. Similarly, the driver is able to rotate the brake dial with another finger in order to engage the brake pedal in proportion with the virtual gear ratio GRB (gear ratio for brake) to slow the vehicle down.

Upon initial configuration of the virtual gear ratios GRT and GRB for the vehicle, such as when the vehicle is manufactured in a factory, the GRT and GRB are set to a reasonable value. For example, a single revolution of the dial when the dial is a wheel or a full displacement of the dial when the dial is a variable sliding switch is set to correspond to a full movement of the throttle or brake pedal from a nil or low set point to a maximum or high set point. However, the operation of the GRT and the GRB can be adapted according to driving preferences.

For example, driving patterns of the throttle and brake can be recorded and stored such that they can be used for adjusting the GRT and GRB. Further, rotation or displacement of the throttle and brake dials can be measured in one of several possible ways, including an angular speed averaged over time or a physical displacement over time. These averaged speeds are recorded and matched with the current vehicle speed in the form of a look-up table or other functional approximation device, which can include an artificial neural network.

Thus, the displacement or rotation of the dials at different vehicle speeds can actuate the pedals differently, depending on the recorded average patterns of the dials activations, because the GRT and GRB are speed and pattern dependent. For example, a gentler application of brakes is usually required when driving at higher speeds to avoid tire slipping and skidding, which is similar to a throttle and braking control implemented in state-of-art adaptive cruise control (ACC) systems.

Alternatively, the driver can simply adjust the GRT and GRB, independently, by using a knob or activation switch in the driver cabin of the vehicle. Though this option is easier to implement than the adaptive features noted above, and may seem more reliable, the manual action of turning a knob to change the ratio each time the vehicle's speed is increased or reduced can become tiresome to drivers. Furthermore, the GRT and GRB would still have to be verified by a vehicle control system to avoid tire slipping, skidding or other types of vehicle control loss. However, it should be noted that both an adjustable knob and an adaptive learning control system can be used in cooperation. For example, a driver may choose to switch between an adaptive learning mode, which is based on the driver's usual habits or preferences, while at the same time being able to switch away from the adaptive mode to a luxury or sport mode, where gear ratios are reduced or increased by a predetermined amount to achieve a gentler or more responsive driving experience.

Further, a manual gear ratio knob can also be used to adjust the overall gear ratio GR*, while the adaptive part handles style and speed specific adjustments, for example, GR*=GR*1×GR*2, where GR*1 is the manually specified part (by the manual knob), GR*2 is the adaptive part, and the single star (*) stands for the throttle T or the brake B. For safety, the reduction/increase of GR*1 may be limited, with an extension of the limits only possible through a separate interface. For example, the driver may make an appropriate choice from a control menu or through other operation of an input/output interface of a display connected to an ECU of the vehicle, which is discussed in more detail below.

Further, it is preferred that the aspects of this disclosure are provided with a mechanism to void or cancel control of the throttle and the brake by the throttle and brake dials by a driver's active use of a foot pedal of the vehicle, specifically the throttle or brake pedals. In this operation, it is most preferred that the throttle and brake dials are moving or being displaced in proportion to an activation of the corresponding throttle or brake dial. In one sense, when a dial begins to turn, its initial angle is matched with the current angle of the appropriate pedal to avoid an appearance of sudden change of throttle and brake. On the other hand, activation of a foot pedal of the throttle or the brake should also activate a displacement of the throttle or brake dial, respectively, to avoid an appearance of a sudden change in throttle or brake when a user actively initiates use of the throttle or brake dial after using the throttle or brake pedals.

Figure 4:
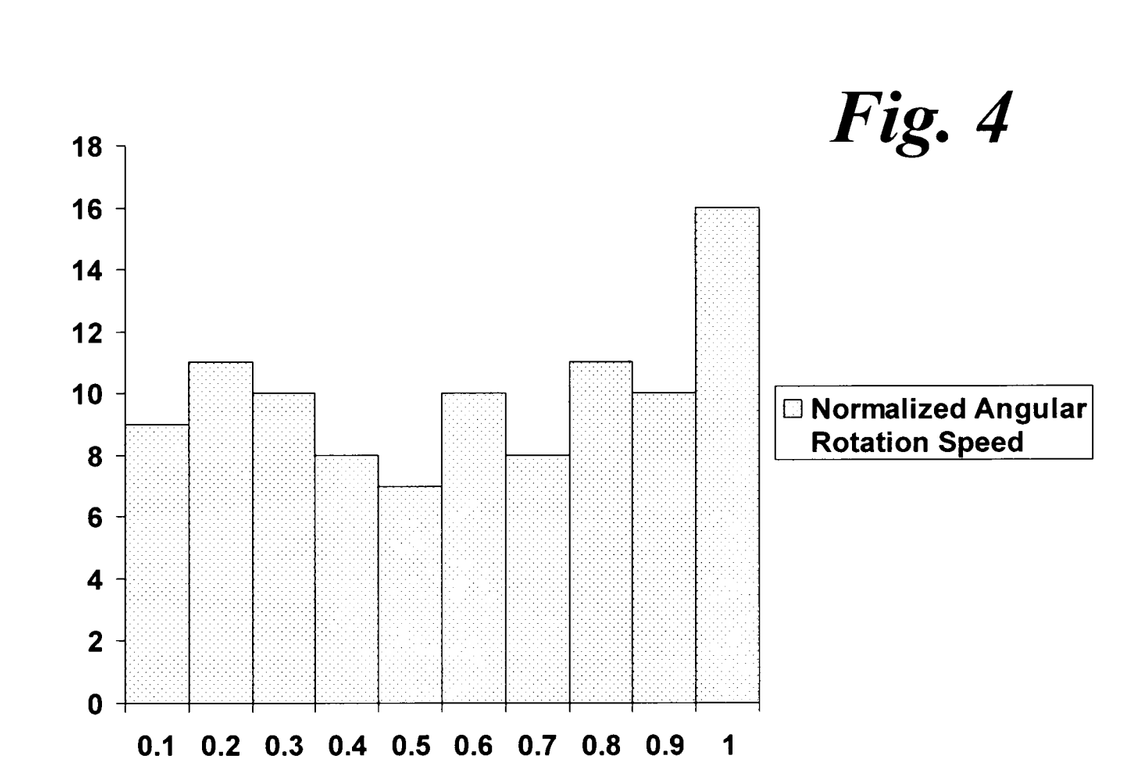
FIG. 4 is a histogram of normalized angular rotation speeds for a throttle gear ratio in one aspect of this disclosure at a first vehicle speed.
Figure 5:
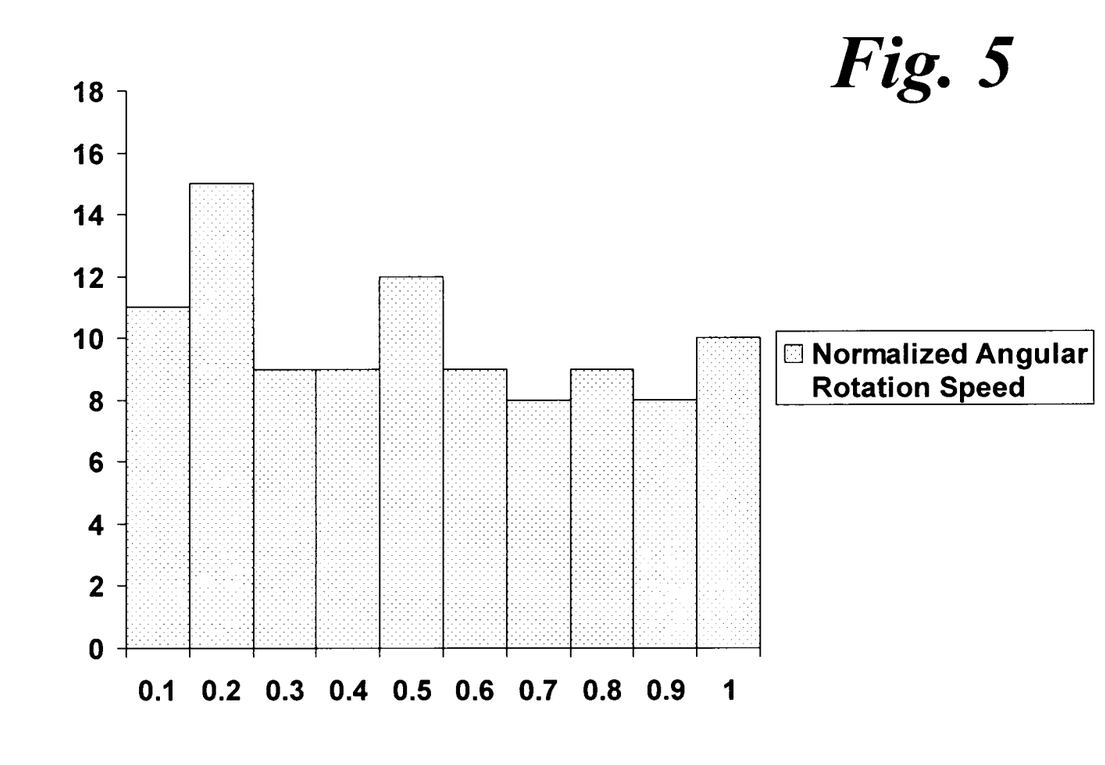
FIG. 5 is a histogram of normalized angular rotation speeds for a throttle gear ratio in another aspect of this disclosure at a second vehicle speed.

FIGS. 4 and 5 provide histograms of normalized angular rotation speeds of a throttle gear ratio GRT in several aspects of this disclosure. It should be appreciated that corresponding histograms are applicable to the GRB, but are not provided for brevity. Also, the values shown in FIGS. 4 and 5 are merely exemplary for one driver, and are variable between drivers based on a driver's habit or preferences, and will vary between throttle and brake control perspectives.

FIG. 4 shows a histogram of a normalized angular rotation speed of the throttle pedal corresponding to a first vehicle speed V0. This vehicle speed is measured at the moment when the pedal starts moving, and the vehicle speed will be looked up when the throttle dial starts rotating or displacing in order to determine the driver preferred gear ratio. Accordingly, this first vehicle speed could be 0 mph. The rightmost rotation speed occurs at the maximum number of times (16) for this histogram. Therefore, the GRT is set to a value corresponding to the most frequently occurring rotation speed. Larger GRT means that the throttle pedal moves slower for the same rotation angle or displacement of the throttle dial than in the case of a smaller GRT. Thus, if higher rotation speeds or displacement speeds occur more frequently than lower rotation or displacement speeds, as shown in the figure, then the GRT is reduced. It should be noted that this might correspond to "aggressive driving" because higher rotation speeds generally correspond to larger accelerations of the vehicle.

FIG. 5 is similar to FIG. 4, but shows a histogram of normalized angular rotation speeds of the throttle power corresponding to a second vehicle speed V1. This speed is measured at the moment when the pedal starts moving, and the speed will be looked up when the throttle dial starts rotating in order to determine the driver preferred gear ratio. Accordingly, this second vehicle speed could be 30 mph. The second from left rotation speed occurs at the maximum number of times (15) for this histogram. Therefore, the gear ratio GRT is set to a value corresponding to this most frequently occurring rotation speed. Note that this GRT value is supposed to be lower than in the case of the GRT in FIG. 4 because the driver preferred rotation speed, and consequently the corresponding vehicle acceleration, in FIG. 5 is lower than that of FIG. 4. Consequently, FIG. 5 would result in less aggressive driving than that shown in FIG. 4.

The above-noted processes and electronically driven systems can be implemented via a discrete control device provided in the vehicle, or can be implemented by a central processing device of the vehicle, such as an ECU. In preferred aspects, the functionality described herein is provided via a central control unit, such as an ECU, which is discussed below relative to FIG. 6.

Figure 6:
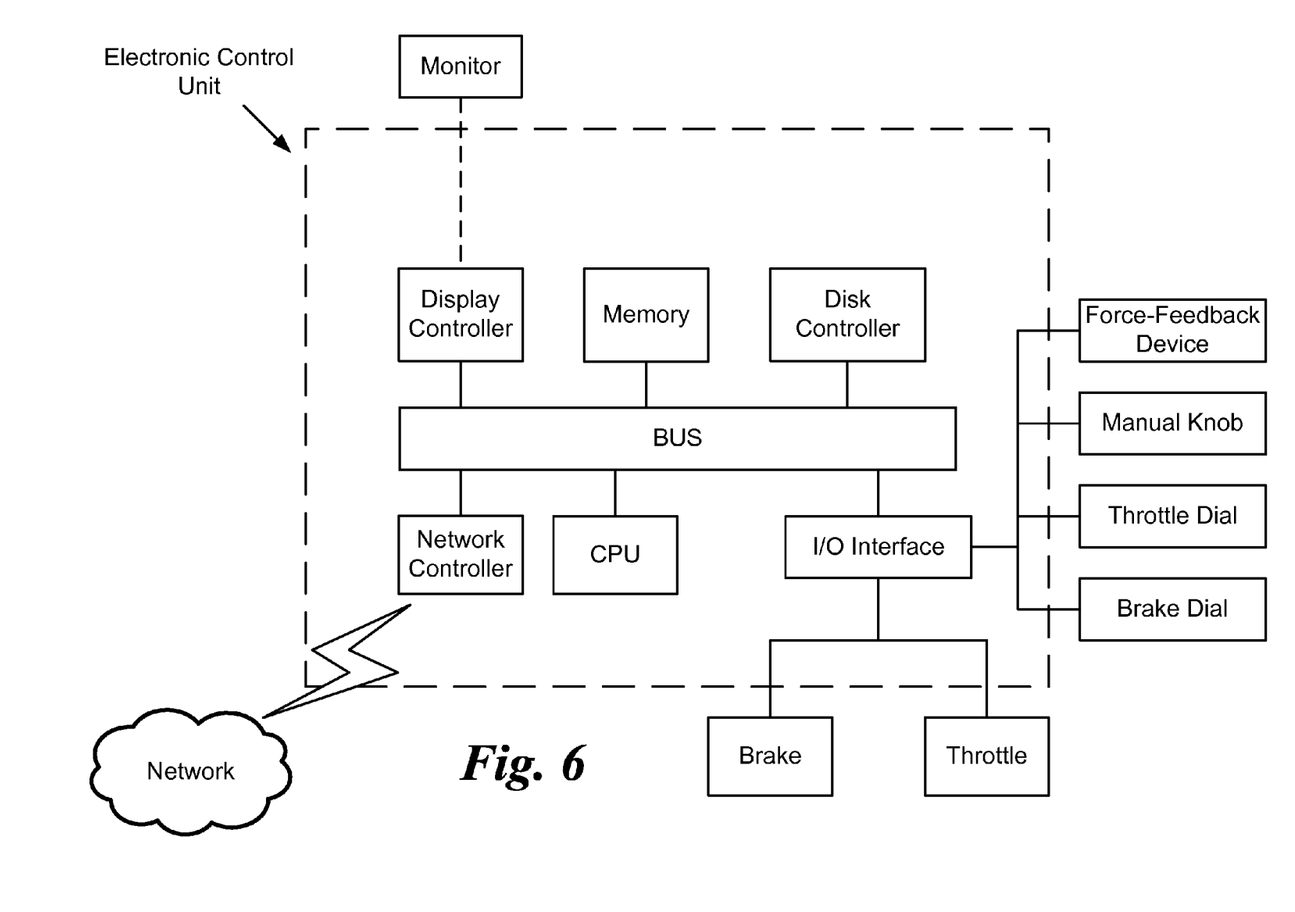
FIG. 6 is block diagram of an electronic control unit for a vehicle to control the interoperability of the throttle and brake of the vehicle via the throttle and brake dials shown in FIG. 1.

As shown in FIG. 6, an ECU in accordance with this disclosure can be implemented using a microprocessor or its equivalent, such as a central processing unit CPU or at least one application specific processor ASP (not shown). The microprocessor utilizes a computer readable storage medium, such as a memory (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or a CD-ROM drive.

The microprocessor, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit form parallel processing capabilities of a multi-cored CPU.

In another aspect, results of processing in accordance with this disclosure can be displayed via a display controller to a monitor, as shown in FIG. 6. The display controller would then preferably include at least one graphic processing unit for improved computational efficiency. Additionally, an input/output interface is provided for connecting the throttle dial and the brake dial to the ECU and the throttle and brake of the vehicle. Although the throttle and brake of the vehicle can include traditional mechanical control systems with electronic actuators or hydraulic actuators for varying a mechanical throttle and brake, electronic drive-by-wire systems are preferred to incorporate the functionality of other electronically driven systems such as electronic stability control (ESC) and automated driving systems such as parking assist, lane assist systems and adaptive cruise control.

Further, as to other input devices, the same can be connected to the input/output interface. For example, a keyboard or a pointing device (not shown) for controlling parameters of the various processes and algorithms of this disclosure can be connected to the input/output interface to provide additional functionality and configuration options of the GRT and GRB. Moreover, the monitor can be provided with a touch-sensitive interface to route commands to the ECU.

Additionally, the above noted components can be coupled to a network, such as the Internet or a local intranet, via a network interface for the transmission or reception of data, including the controllable parameters disclosed herein. Such a data transfer can be performed at a vehicle repair facility for diagnostic purposes. However, such a data transfer can also be performed at a home location via a wireless network to allow a user to adjust the parameters via a personal computer (not shown). An exemplary wireless network can include a network compliant with IEEE 802, preferably IEEE 802.11 (Wi-Fi and WLAN), IEEE 802.15.1 (Bluetooth) and/or IEEE 802.3 (Ethernet). Lastly, a central BUS is provided to connect the above-noted components together and provides at least one path for digital communication there between.

Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary embodiments of this disclosure in which functions may be executed out of order from that shown or discussed, including substantially concurrently or in reverse order, depending upon the functionality involved, as would be understood by those skilled in the art.

Moreover, as will be recognized by a person skilled in the art with access to the teachings of this disclosure, several combinations and modifications of the aspects of this disclosure can be envisaged without leaving the scope of this disclosure. Thus, numerous modifications and variations of this disclosure are possible in light of the above teachings, and it is therefore to be understood that within the scope of the appended claims, this disclosure may be practiced otherwise than as specifically described herein.

The invention claimed is:

1. A steering wheel, comprising:
    a rim that rotates about a first axis to steer a vehicle;
    a throttle dial disposed in a surface of the rim to control a throttle of the vehicle, the throttle dial having a variable output to control an amount the throttle is displaced in proportion to an amount the throttle dial is displaced, wherein
        the throttle dial pivots about a second axis that is adjustable about a third axis,
        the third axis extends in a direction that is radial to the rim and the first axis, and
        in a first position, the second axis extends in a direction that is parallel to the first axis, and in a second position, the second axis extends in a direction that is tangential to the rim; and
    a sleeve of the rim in which the throttle dial is disposed, wherein
        the sleeve rotates about an axis tangential to the rim to vary a position of the throttle dial,
        the sleeve forms a contiguous surface with a remainder of the rim about a circumference of the rim,
        the rim has a circular shape and the sleeve of the rim forms a portion of the circular shape, and
        ends of the sleeve extend around an entire circumference of a cross-section of the rim and coincide with respective edges of the remainder of the rim.

2. The steering wheel according to claim 1, wherein the throttle dial is a throttle wheel which rotates about the second axis.

3. The steering wheel according to claim 1, wherein the throttle dial is disposed in an upper-left portion of the rim when the steering wheel is rotated to a straight vehicle direction.

4. The steering wheel according to claim 1, wherein the surface of the rim in which the dial is disposed faces the first axis about which the rim rotates, such that the throttle dial extends from an interior portion of the rim towards the first axis.

5. The steering wheel according to claim 1, further comprising:
    a brake dial disposed in a surface of the rim to control a brake of the vehicle, the brake dial having a variable output to control an amount the brake is displaced in proportion to an amount the brake dial is displaced.

6. The steering wheel according to claim 5, wherein displacement of the brake dial results in a corresponding displacement of the brake via a virtual brake gear according to a virtual brake gear ratio, the virtual brake gear ratio being a ratio between the amount the brake dial is displaced and the amount the brake is displaced.

7. The steering wheel according to claim 6, wherein the brake gear ratio is adjusted based on at least one of: recorded driving patterns to adapt the brake gear ratio to driving preferences and a speed of the vehicle.

8. The steering wheel according to claim 6, wherein the brake gear ratio is adjusted based on a combination of at least recorded driving patterns to adapt to driving preferences and a speed of the vehicle.

9. The steering wheel according to claim 5, wherein
    the brake dial is a brake wheel which rotates about a fourth axis,
    the brake wheel rotates about a fifth axis that is substantially perpendicular to the fourth axis such that the fourth axis, about which the brake wheel rotates, is variable from being substantially parallel to the first axis to being substantially perpendicular to the first axis, and
    the fifth axis extends in a direction that is radial to the rim and the first axis.

10. The steering wheel according to claim 5, wherein the brake dial is disposed in an upper-right portion of the rim when the steering wheel is rotated to a straight vehicle direction.

11. The steering wheel according to claim 1, wherein the throttle dial is at least partially recessed into the surface of the rim.

12. The steering wheel according to claim 1, wherein:
    displacement of the throttle dial results in a corresponding displacement of the throttle via a virtual throttle gear according to a virtual throttle gear ratio, the virtual throttle gear ratio being a ratio between the amount the throttle dial is displaced and the amount the throttle is displaced, and
    a value of the virtual throttle gear ratio is adjusted based on at least a speed of the vehicle.

13. The steering wheel according to claim 12, wherein the value of the virtual throttle gear ratio is adjusted based on the speed of the vehicle and at least recorded driving patterns to adapt the virtual throttle gear ratio to driving preferences.

14. The steering wheel according to claim 12, wherein the virtual throttle gear ratio is adjusted based on at least the speed of the vehicle and recorded driving patterns to adapt to driving preferences.

15. A steering wheel, comprising:
    a rim that rotates about a first axis to steer a vehicle; and
    a brake dial disposed in a surface of the rim to control a brake of the vehicle, the brake dial having a variable output to control an amount the brake is displaced in proportion to an amount the brake dial is displaced, wherein
    the brake dial pivots about a fourth axis that is adjustable about a fifth axis,
    the fifth axis extends in a direction that is radial to the rim and the first axis, and
    in a first position, the fourth axis extends in a direction that is parallel to the first axis, and in a second position, the fourth axis extends in a direction that is tangential to the rim; and
    a sleeve of the rim in which the brake dial is disposed, wherein
        the sleeve rotates about an axis tangential to the rim to vary a position of the brake dial,
        the sleeve forms a contiguous surface with a remainder of the rim about a circumference of the rim,
        the rim has a circular shape and the sleeve of the rim forms a portion of the circular shape, and
        ends of the sleeve extend around an entire circumference of a cross-section of the rim and coincide with respective edges of the remainder of the rim.

* * * * *